Oct. 14, 1947.  J. P. DE ROSE  2,429,017
ADJUSTABLE SEAT SUPPORT
Filed June 14, 1943   3 Sheets-Sheet 1
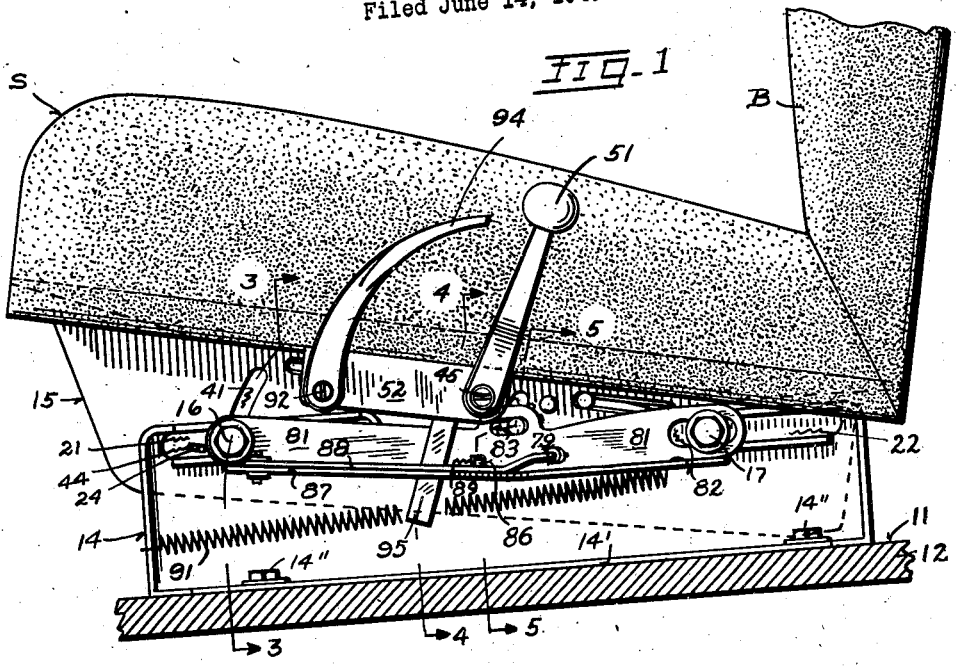
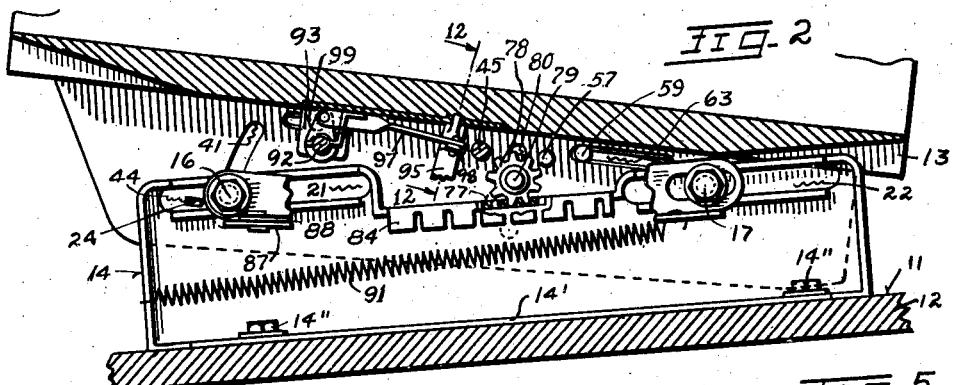
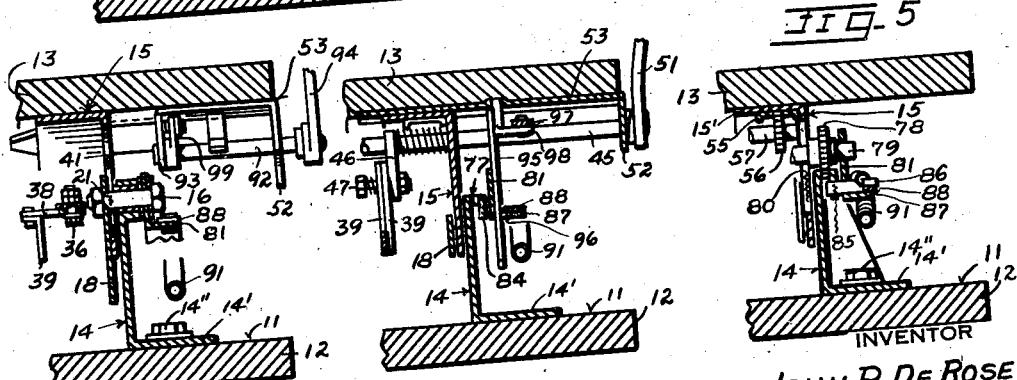
INVENTOR
JOHN P. DE ROSE
BY Henry N. Young
ATTORNEY Oct. 14, 1947.  J. P. DE ROSE  2,429,017
ADJUSTABLE SEAT SUPPORT
Filed June 14, 1943   3 Sheets-Sheet 2

INVENTOR
JOHN P. DE ROSE
BY Henry N. Young
ATTORNEY

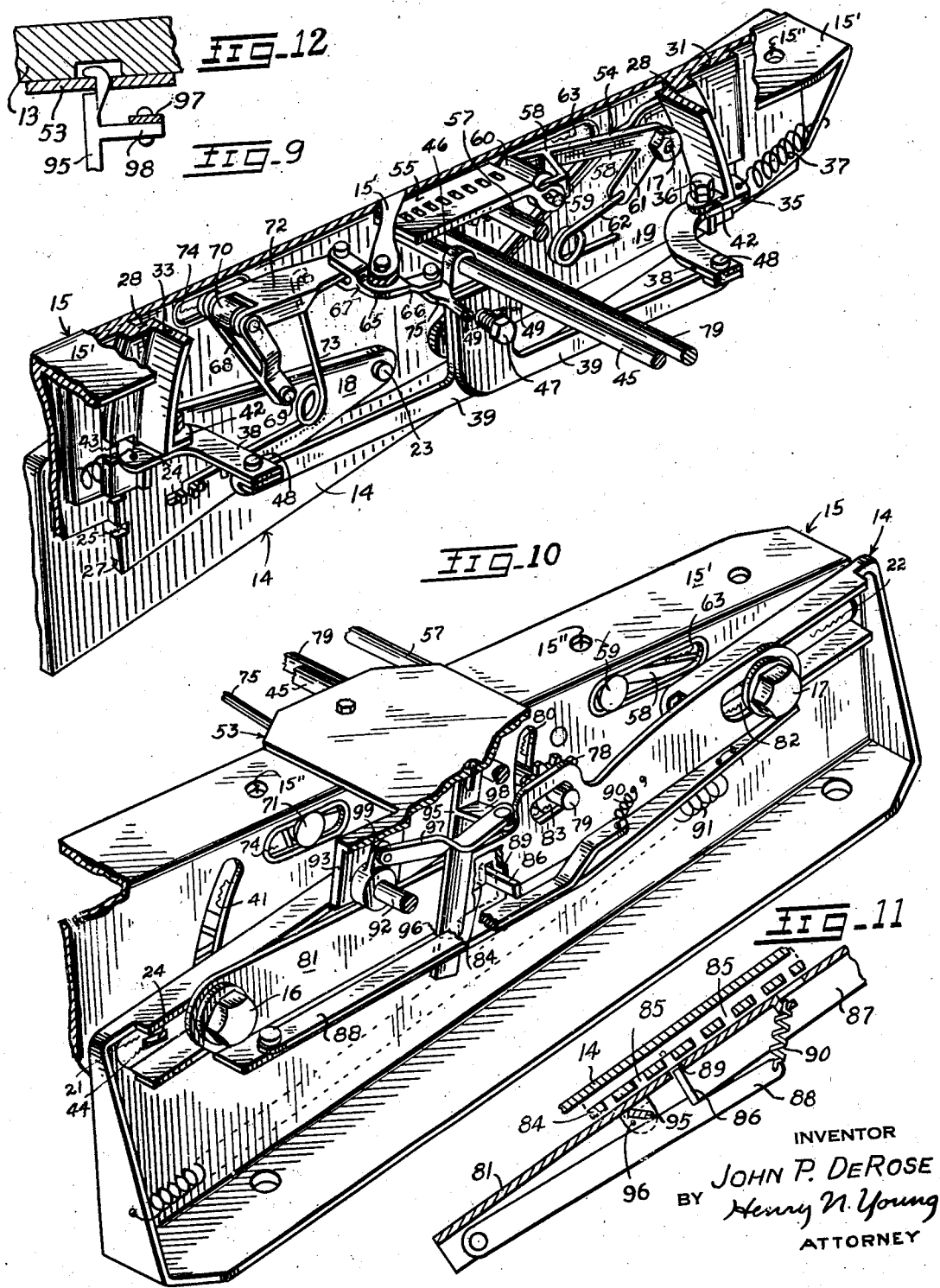

Patented Oct. 14, 1947

2,429,017

UNITED STATES PATENT OFFICE 2,429,017

ADJUSTABLE SEAT SUPPORT

John P. De Rose, Albany, Calif.

Application June 14, 1943, Serial No. 490,715

8 Claims. (Cl. 155—14)

The invention relates to adjustable supports for seats.

The general object is to provide an improved seat mounting which permits mutually independent height and/or angularity and/or fore-and-aft adjustments of the seat with respect to its base.

Another object is to provide a seat repositioning control which positively assures only corresponding seat adjustments at the opposite seat sides.

A further object is to provide a seat mounting of the character described which is of relatively simple and inexpensive structure.

The invention possesses other objects and features of advantage, some of which, with the foregoing, will be set forth or be apparent in the following description of a typical embodiment thereof, and in the accompanying drawings, in which, Figure 1 is a fragmentary left-side view of a seat mounting embodying the features of the present invention and supporting a seat from a floor.

Figure 2 is a fragmentary left-side view of the mounting with certain elements thereof broken away.

Figures 3 and 4 and 5 are fragmentary sections taken respectively at the broken lines 3—3 and 4—4 and 5—5 in Figure 1.

Figure 9 is an enlarged perspective view of the support assembly of Figure 7.

Figure 10 is an enlarged perspective view of the support assembly of Figure 1, certain elements being broken away.

Figure 11 is an enlarged fragmentary plan section taken at the line 11—11 in Figure 5, a detent element of the assembly being inoperatively disposed.

Figure 12 is an enlarged fragmentary upright section taken at the line 12—12 in Figure 2.

Figure 6:
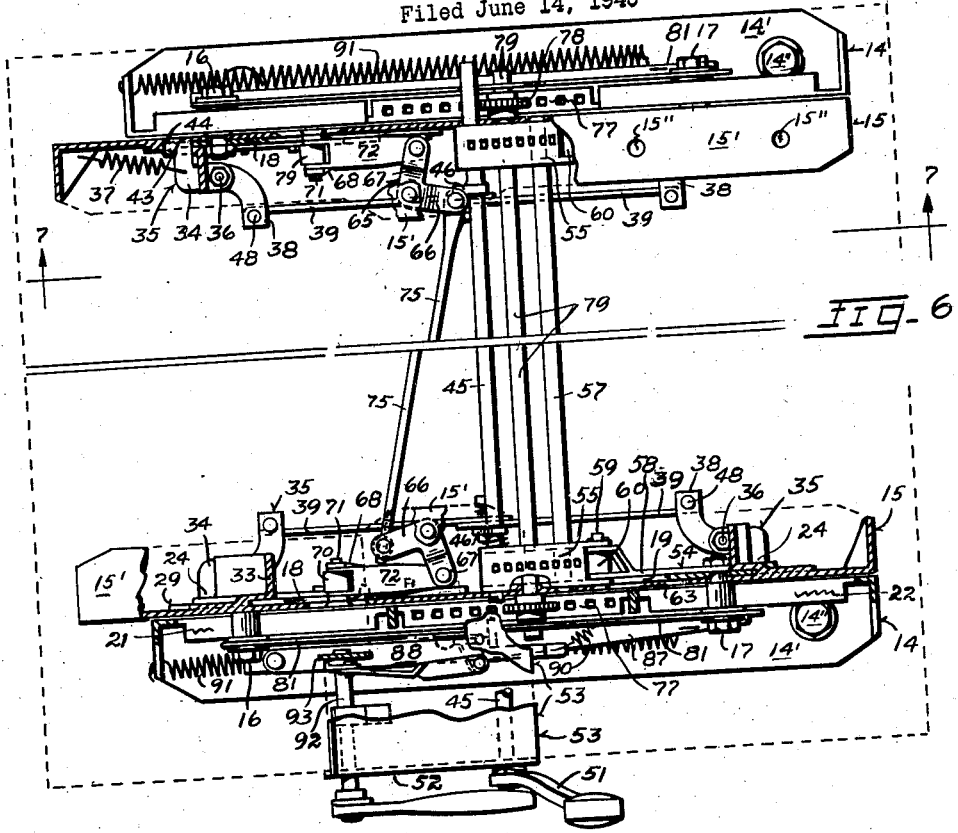
Figure 6 is a plan view of the mounting structure, parts thereof being broken away at different levels.

The features of present invention are shown as embodied in the structure of a seat unit which comprises a seat having a bottom S and a back B and mounted on an adjustable support structure having its base resting upon a supporting surface 11 such as that provided by a floor 12. The present seat is of a usual upholstered type having a rigid bottom plate or frame 13 for direct mounting on the adjustable support structure, the said support structure having been particularly designed for its installation for supporting a seat in a motor-driven vehicle for use by the operator of the vehicle, though generally applicable wherever its types of adjustment are advantageous.

The present seat support device generally comprises a pair of similar base members 14 for fixing to the floor 12 to extend upwardly therefrom beneath the different seat ends, a pair of similar members 15 for fixing to the seat bottom 13 to depend therefrom, and front and rear pairs of similar support pins 16 and 17 adjustably mounted on one member and engaged with the other to provide the support of each seat-engaging member 15 from the corresponding base member 14 to provide or permit the desired seat adjustments. The present base members 14 comprise plates provided with flanges 14' extending transversely therefrom at their bottom edges to provide floor bearings for the plates and a means by which the plates may be secured to a floor 12 in relatively fixed and mutually parallel relation, as by bolts 14''. The members 15 comprise plates provided with transverse edge flanges 15' by which they may be secured to the seat bottom 13, as by screws through holes 15'' therein, in spaced parallel relation, for their simultaneous disposal opposite and adjacent the inner faces of the plates 14.

Essentially, the support pins 16 and 17 of a cooperative pair thereof at either seat end are carried by a plate 14 or 15 for independent adjustments on the plate in upright lines while operatively engaging the plate 15 or 14. The present pins 16 and 17 generally comprise studs projecting horizontally from intermediate support members 18 and 19 respectively and are arranged for supported engagement upon and along horizontal bearing faces provided by the plates 14, with the members 18 and 19 in turn mounted on the seat plates 15 for independent adjustments to adjust the support pins 16 and 17 in upright lines with respect to said plates. Near their upper edges, the present base plates 14 are provided with corresponding forward and rear slots 21 and 22 which extend parallel to the base edges of the plates and constantly and slidably receive the support pins 16 and 17 respectively for the support of the seat on the bottom slot faces for its fore-and-aft adjustment, the slots 21 and 22 being of such lengths and so related that they determine the range of fore-and-aft adjustment of the seat. For providing a desired range of angularity adjustments of the seat, the rear slots 22 are slightly below the level of the front slots 21, said slots being conveniently shown and referred to as being horizontal, though they need be only substantially so in practice.

It will now be noted that the members 18 and 19 generally comprise elongated and similar flat link-like elements which respectively provide the support pins 16 and 17 near one end and are pivoted to the seat plates 15 for swinging adjustment along the opposed plate faces by means of fixed hinge pins 23 engaging their other ends and preferably located centrally of the seat plates; the members 18 and 19 respectively extend forwardly and rearwardly of their hinging axes to appropriately space the support pins 16 and 17. Catch-bolts or dogs 24 mounted on the plate 15 normally extend into transverse openings 25 of the members 18 or 19, there being a series of said openings 25 for selective engagement by each dog 24 and arranged in a generally upright arcuate line having the hinge pin at its center of curvature for the selective disposal of the openings 25 of a line to receive the dog.

In the present structure, the pins 16 and 17 comprise bolts which are fixed to the members 18 and 19 respectively and rotatably carry sleeves for engagement as rollers with the bottom edges of the slots 21 and 22 of the base plates 14, transverse flanges of the plates 14 at said edges providing increased bearing areas for the rollers thereat. With the front support pins 16 engaged in the front slots 21 of the base plates 14, the rear support pins 17 engaged in the rear slots 22 of the plates 14, the front dogs 24 engaged in the corresponding openings 25 of the members 18, and the rear dogs 24 engaged in corresponding openings 25 of the members 19, it will be understood that the four support pins may be mutually coplanar to slidably support the seat upon the plates 14 for fore-and-aft adjustment while the seat maintains a fixed height and angularity disposal in accordance with the particular corresponding openings 25 engaged by the dogs 24 at the front and at the rear of the seat. Broadly, the present members 18 and 19 pivotally engage and connect corresponding base plates 14 and seat plates 15 and are arranged for adjustably fixed positioning with respect to the plates by means on the seat plates.

Figure 7:
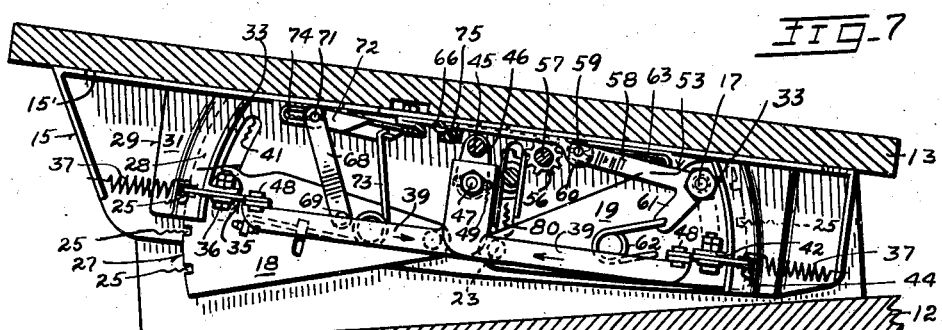
Figure 7 is a sectional view taken at the line 7—7 in Figure 6.
Figure 8:
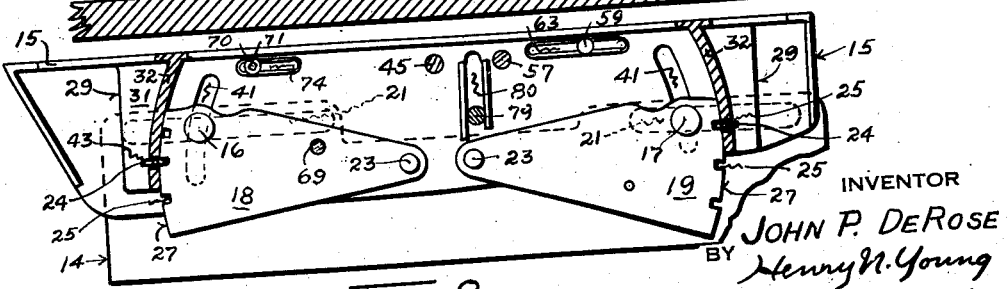
Figure 8 is a fragmentary showing of the seat support structure of Figure 7, but omits certain elements and has the disclosed parts arranged for the support of a seat in a different adjusted disposition.

As is particularly disclosed in Figures 6 to 8, the support link members 18 and 19 providing the support pins 16 and 17 are generally sector-shaped, with the pivot pins 23 engaging them at their apical ends and with their opposite free end portions bounded by arcuate end edges 27 and having the portions adjacent the edges 27 engaged between the mutually opposed faces of guide plates 28 and the seat plates 15 for their confinement to swinging movements in their planes along the opposed faces of the plates 15 which mount them. As shown, members 29 providing the guide plates 28 for a support link 18 or 19 are of mutually complementary structure and are each shaped from sheet material to provide a flat base portion 31 which is secured to the plate 15 in the plane of a member 18 or 19 beyond the members and carries the guide plates 28 on a transverse connecting portion or offset 32. The base portions 31 of the members 29 are suitably fixed to the seat plate 15, as by welding, and the free edges of the plates 28 are provided with outturned flanges 33 which, in the present instance, are fixed at their upper ends to the top flanges 15' of the members 15 to provide bracket supports for the flanges thereat.

By reference to Figures 6 and 7, it will be noted that each dog 24 comprises the terminal portion of an L-shaped arm 34 of a flat lever member 35 which is suitably mounted on the seat plate 15 for rocking on a fixed pivot pin 36 about an axis parallel to the plate for the movement of the dog transversely of the plate for its dogging disposal in an opening 25 of a member 18 or 19. As shown, the openings 25 of the members 18 and 19 comprise transverse radial notches extending through the member from the arcuate end edges 27, there being a plurality of such notches in their lines for selectively receiving the associated dogs 24. Tension springs 37 constantly coact between the lever arm 34 and an anchorage on the seat plate 15 which mounts it for urging an operative disposal of the dog 24 in an opening 25, and the other lever arm 38 has a tension link 39 secured at its extremity for actuation by a suitable means to rock the lever 35 for withdrawing the dog 24 from an opening 25 in which it may be engaged; it will thus be understood that each dog 24 is generally operative as a catch-bolt with respect to a support member 18 or 19 by reason of the action of the spring 37.

In the present structure, the seat plates 15 are disposed between the members 18 and 19 and the corresponding base plates 14, the support pins 16 and 17 extend freely through arcuate slots 41 of the seat plates 15 concentric with the hinge pins 23, and the pivot pins 36 mount the members 35 on ears 42 extending from the flanges 33 of the elements 29 in planes perpendicular to the supporting plates 15 and approximately radial of the hinging axes of the corresponding pins 23. The present arrangement is such that each dog 24 is engageable through mutually aligned openings 43 and 44 respectively provided in the corresponding guide element 29 and the seat plate 15 whenever a notch 25 is aligned with said openings, whereby to support the seat plate 15 upon the adjustably fixed member 18 or 19 which carries the dog. It will be understood, however, that the members 18 and 19 might be disposed between corresponding base and seat plates 14 and 15 for direct guided swinging adjustments in their planes between the plates; in such a case, the dog-mounting ears 42 would then extend directly from each seat plate 15, and the arcuate slots 41 of the plates 15 would not be needed.

Means are provided for simultaneously and alternatively withdrawing the front or rear dogs 24 for permitting an adjustment of the height of the seat at its front or rear. As particularly shown in Figures 1 and 2 and 6 and 7, the dog-releasing means essentially comprises a rock-shaft 45 journalled in and extending between the seat plates 15 close to the seat bottom 13, and having crank-and-link connections with the control arms 38 of the levers 35 which provide the front and rear pairs of dogs. Crank arms 46 depend rigidly from the shaft 45 and have terminal pins 47 simultaneously engaging corresponding ends of the links 39 which have their other ends pivotally secured to the lever arms 38 by pins 48. The present links 39 are generally flat and L-shaped, and have slots 49 through their upwardly directed portions for receiving the crank pins 47, the slots extending in generally parallel relation to the seat bottom and having relatively-opposite ends of each associated pair thereof normally engaged by the associated pin 47 by the action of the springs 37 operating through the dogging levers 35 and the links 39. The arrangement is such that a rocking of the shaft 45 in one possible direction from its normal rotatively-centered position will simultaneously displace the forward links 39 to actuate the corresponding levers 35 against the resistance of their springs 37 to withdraw their dogs and thereby release the front of the seat; an opposite rocking of the shaft from its normal position will effect the release of the rear of the seat in the same manner. One end of the rock-shaft 45 extends beyond the side of the seat and its cushion and carries an upwardly-extending hand lever 51 for use in rocking the shaft for selectively releasing front or rear pairs of dogs 24, the springs 37 operating through the levers 35 normally positioning the hand lever 51 in the position which is illustrated. The extending end of the rock-shaft 45 which carries the hand lever 51 may be journalled in a depending flange portion 52 of a hanger bracket 53 fixed to and beneath the seat bottom 13. In the present structure the rock-shaft 45 is arranged to be positioned above the top edges of the base plates 14 for all seat settings.

Means are provided for insuring uniform height adjustments of the seat at either its front or rear, two different arrangements for the purpose being disclosed. As particularly shown in Figures 5 and 6 and 7 and 9, the height adjustment control means for the rear part of the seat comprises levers 54 pivoted on the support members 19 and having racks 55 hinged thereto for pivotal movement about axes parallel to the seat bottom and constantly engaged between the under faces of the flanges 15' of the seat plates 15 and gears 56 mounted on a shaft 57 journalled in and between the plates 15. The extremities of the arms 58 of the levers 54 to which the racks 55 are hinged at the pins 59 carry rollers 60 which constantly engage the under faces of the flanges 15 while positioning the racks close to said flange faces, and the levers 54 are pivoted on the pins 17 at the opposite sides of the plates 19 from the support portions of the pins. As particularly shown, the arms 58 are forked to receive the rollers 60 between the fork sides, and the pins 59 mount the rollers as well as provide the hinged connection of the racks and arms.

Arms 61 of the levers 54 are so engaged by springs 62 as to effect constant and forcible engagements of the rollers 60 with the under faces of flanges 15'; in this manner, the seat is constantly urged to a raised position with respect to the corresponding support pins 17. As shown, the pins 59 extend through slots 63 in the plates 15 with the enlarged heads of the pins disposed at the opposite sides of the plates 15 from the members 19; the engagement of the pins 59 with the rear ends of the slots 63 is arranged to function as a stop means to limit the raising of the seat with respect to the support pins 17. It will be understood that when the rear dogs 24 are withdrawn by a rearward rocking of the hand lever 51, the height adjustment of the rear seat portion may be effected against the resistance of the springs 62, and must be uniform at the two seat ends because both levers 54 are automatically kept in corresponding positions with respect to the seat through the action of the gears 56 with respect to the racks 55.

While the described height-positioning control at the rear support members 19 may be provided and utilized at and in connection with the front support members 18, a different height-positioning control is shown as provided in connection with the latter members. By particular reference to Figures 6 and 7 and 9, it will be noted that bell-crank levers 65 are pivoted to and beneath the flanges 15' for rotation about axes which are perpendicular to the flanges, said levers having corresponding arms 66 extending rearwardly and forwardly through their pivot points on the different flanges respectively and having arms 67 extending toward the plates 15. Forked thrust members 68 extend from pivot pins 69 on the members 18 and mount rollers 70 at their other ends and between their sides on pivots 71 for constant bearing engagements with the flanges 15' at points thereof forwardly of its pivot points for the levers. Link members 72 connect the pivots 71 with the lever arms 67 whereby relative movements of the support members 18 and the seat plates 15, while the rollers engage the flanges 15', are operative to rock the levers 65. Helical springs 73 have their extremities secured to corresponding support members 18 and links 72 to constantly and yieldingly urge the swinging of the members 68 rearwardly and against the flanges 15' in a manner to urge the raising of the seat plate thereat upon the members 68 and with respect to the front support pins 16. The head end portions of the pins 71 extend through slots 74 provided in the plates 15 in the plane of movements of the pins and are arranged to laterally engage the rearward ends of such slots as a stop means to limit the raising of the seat plate with respect to the support pins.

By particular reference to Figure 6, it will be noted that a rod 75 of adjustable length connects the ends of the oppositely directed lever arms 66 for assuring only corresponding and like adjustment movements of the rollers 70 along the flanges 15' and thus to effect an equal adjustment of each of the members 18; in this manner, only like height adjustments of the front ends of the seat plates 15 with respect to the front support pins 16 is permitted. It will be understood that the present height adjustment control may be provided at the back of the seat in lieu of the previously described arrangement under which corresponding adjustments are provided through the action of the shaft 57. In reference to the different height adjustment controls which are disclosed, it will be evident that the lever arms 58 mounting the flange-contact rollers 60 on the pins 59 and the members 68 mounting the rollers 70 on the pins 71 are operative equivalents as toggle struts for determining the spacing of the seat from support pins 17 and 16 respectively, and that the difference in the control devices relates particularly to the interconnection of corresponding support elements 18 or 19 for assuring like angular positionings thereof.

Centrally thereof, the base plates 14 are provided with upwardly-facing racks 77 arranged for constant engagement by like gears 78 mounted on a common shaft 79 disposed above the plates; as particularly shown, the racks 77 are provided by lines of perforations in flanges extending inwardly from depressed intermediate top edge portions of the base plates 14. End portions of the shaft 79 inwardly of the gears 78 slidably engage corresponding upright slots 80 provided in the seat plates 15, said slots permitting a full range of height adjustments for the seat while confining the shaft to fore-and-aft movements with the seat. With the gears 78 engaging the racks 77 at corresponding points thereof, it will be understood that the connection of the gears 78 by the shaft 79 for their rotation together insures like fore-and-aft adjustments for both seat sides.

For maintaining the cooperative engagement of the gears 78 with their corresponding racks 77, the end portions of the shaft 79 beyond the gears 78 thereon are constantly engaged with members 81 which, as is brought out in Figures 1 and 2 and 4 and 5 and 6 and 10, connect the support pins 17 and 16 at the different seat ends in rotative engagement therewith. Because the permitted independent adjustments of the pins 16 and 17 with respect to the seat plates 15 may slightly vary the mutual spacing of cooperative support pins in their common plane, the members 81 rotatably and fittedly receive the pins 16 in cylindric bores at their forward ends while rotatably and slidably receiving the pins 17 in slots 82 at their opposite ends, said slots extending substantially in said planes. To permit the desired angular adjustments of the seat with respect to the plane of the pins 16 and 17, the members 81 are provided with suitably-positioned slots 83 of appropriate length extending parallel to the plane of the pins and slidably receiving the shaft extremities.

Means are provided for releasably securing the seat in fore-and-aft adjustment, said means being cooperative between the base and seat plates 14 and 15 respectively. As particularly shown, one of the flanges which provides a rack 77 has a downturned extension 84 at its outer edge, and said extension is provided with a line of transverse openings 85 which, in the present instance, comprise notches extending from the lower extension edges and in which a detent 86 carried by the corresponding member 81 is selectively engageable for securing the adjusted seat against fore-and-aft displacements from an adjusted positioning thereof. As shown, the member 81 at the left side of the seat movably carries the detent 86 for the normal projection thereof inwardly from the member and into a notch 85 to thereby releasably secure the seat against its fore-and-aft displacement.

The members 81 are formed with outturned flanges, and the outturned flange 87 of the member 81 which mounts the detent 86 has a flat arm 88 pivoted to it for a swinging movement in a plane parallel to the flange, the pivotal axis of the arm 88 being adjacent the front end of the member which carries it. The present detent 86 comprises a lateral extension of the arm 88 and is freely movable through an opening 89 in the member 81. A tension spring 90 constantly connects the free end of the arm 88 with an anchorage on the member 81 for constantly and yieldingly urging an operative disposal of the detent 86, a suitable means being provided for manual actuation to rock the arm 88 for effecting an inoperative disposal of the detent during a fore-and-aft adjustment of the seat. Tension springs 91 are constantly operative between rear points of the members 81 and forward points of the base plates 14 to urge a forward positioning of the seat, whereby fore-and-aft setting adjustments of the freed seat are arranged to be made against the resistance of the springs 91.

Forwardly of the shaft 45, a relatively short crank-shaft 92 is mounted on the hanger bracket 53 for rocking to effect the release of the detent 86 when a fore or aft adjustment of the seat is to be made. As is particularly brought out in Figures 3 and 10, the shaft 92 is journalled in and between the bracket flange 52 and a downturned ear portion 93 of the bracket plate, and an outer and protruding end of the shaft 92 carries an upwardly extending handle 94 for use in rocking the shaft. As disclosed in Figures 2 and 4 and 10 and 11, a flat bar 95 depends from a swivel connection of its upper end with the bracket plate and through a D-shaped guide opening 96 provided in the flange 87 of the member 81, said bar being arranged for rotation about its longitudinal axis and said opening having its straight side in the plane of the outer face of the member whereby the bar 95 may be disposed flat against said face. Since the bar 95 is carried from the bracket plate of the seat assembly, it will be moved longitudinally through the opening during height adjustments of the seat, and, accordingly, at least that bar portion which is to be disposed opposite said face of the member 81 is of uniform cross-section so that the guiding function of the opening 96 may be maintained with respect to the bar. The bar 95 is positioned adjacent the detent 86 and between the member 91 and the arm 88 in such relation to the member and arm that it is held flat against the former by the latter when the detent is operative, and a link 97 connects an arm 98 extending transversely from the bar 95 with a crank arm 99 extending radially upwardly from the shaft 92 so that a forward rocking of the handle 97 may rotate the bar for producing a cam action of the bar between the members 81 and 88 to withdraw the detent 86 from its operative position (see Fig. 11) and so permit a fore-and-aft seat adjustment.

While I have particularly shown and described a structure in which the members 14 and 15 respectively comprise base and seat plates of the assembly in a generally preferred arrangement, it will be understood that the present members 14 and 15 and their associated elements might be reversedly used as seat and base members respectively without changing the essential operative combination of the structure. Thus, for instance, if the assembly of the members 14 and 15 be used in an inverted position between a seat and the supporting floor, all described elements may function as before, except that the support elements or pins 16 and 17 would then have the bearing faces provided by the slots 21 of the members 14 support the latter members upon them, instead of having the pins support the members upon them at said bearing faces in the illustrated manner.

From the foregoing description, taken in connection with the accompanying drawings, the advantages of the construction and use of the present alignment-gauging device will be readily understood by those skilled in the art to which the invention appertains. While I have described the features and use of an arrangement which I now consider a preferred embodiment of my invention, I desire to have it understood that the showing is primarily illustrative, and that such changes may be made, when desired, as fall within the scope of the following claims.

I claim:

1. In a seat-supporting means, a base plate disposed in upright position beneath the seat in fore-and-aft relation thereto, a support plate depending from the seat in fixed relation thereto and in parallel relation to the base plate, one said plate being provided with a fore-and-aft slot, a support pin engaging said slot transversely of the plates and slidable along the slot, and a member hingedly mounted on the other plate and carrying said pin in fixed relation to it and at a point spaced from its hinging axis for the adjusted disposal of the pin with respect to the latter plate in a generally upright line while the pin is operative in the slot for supporting the seat from the first plate, and means for releasably fixing said member in adjusted position on the plate which carries it.

2. In a seat-supporting means, a base plate disposed in upright position beneath the seat in fore-and-aft relation thereto, a support plate depending from the seat in fixed relation thereto and in parallel opposition to the base plate, one said plate being provided with a transverse fore-and-aft support face, a support pin constantly engaging said support face transversely of the plate and slidable along said face, a member mounting said pin in fixed relation to it, and means hingedly mounting said member on the other plate for adjustment about a horizontal axis for the adjusted positioning of the pin in a generally upright arcuate line, and means for releasably fixing said member in adjusted position on the plate which carries it.

3. In a seat-supporting means, a base plate disposed in upright position beneath the seat in fore-and-aft relation thereto, a support plate depending from the seat in fixed relation thereto and adjacent the base plate, one said plate being provided with a horizontal slot and the other said plate being provided with an upright arcuate slot in crossing relation to the first slot, a support pin engaged through both of said slots transversely of the plates and longitudinally slidable in and along the slots, a member hingedly mounted on the plate providing the upright slot for rotative adjustment about the axis of curvature of the slot and carrying said pin in fixed relation to it, and means for releasably fixing said member in adjusted position on the plate which carries it.

4. In a seat-supporting means, a base plate disposed in upright position beneath the seat in fore-and-aft relation thereto, a support plate depending from the seat in fixed relation thereto and in parallel opposition to the base plate, one said plate being provided with a fore-and-aft slot, a support pin constantly engaging said slot, transversely thereof and slidable along the slot, a member hingedly mounted on the other plate for rotative adjustment about a horizontal axis and fixedly mounting said pin thereon at a point spaced from said axis, and a dogging means on the latter plate engageable with the pin-mounting member to fix the member and pin in adjusted position on the plate.

5. In a seat-supporting means, a base plate disposed in upright position beneath the seat in fore-and-aft relation thereto, a support plate depending from the seat in fixed relation thereto and in parallel relation to the base plate, one said plate providing a horizontal bearing face, a support pin engaging said face transversely of the plates and slidable therealong, a member carrying said pin in fixed relation to it, means mounting said member on the other plate for adjustment about a horizontal axis for the adjusted positioning of the pin in a generally upright arcuate line, and releasable means for fixing said member in adjusted position on the plate which carries it.

6. In a seat-supporting means, a base plate disposed in upright position beneath the seat in fore-and-aft relation thereto, a support plate depending from the seat in fixed relation thereto and in parallel relation to the base plate, one said plate providing forward and rear horizontal bearing faces, support pins engaging said faces transversely of the plates and slidable therealong, members carrying said pins in fixed relation to them, means pivotally mounting said members on the other plate for independent adjustments thereof about horizontal axes for the adjusted positioning of the pins thereon in a generally upright arcuate line, and releasable means for fixing said members in adjusted position on the plate which carries them.

7. A seat supporting structure according to claim 6, in which said bearing faces and said pins slidable therealong provide for fore-and-aft adjustment of said seat, and means for locking said seat in adjusted position comprising keeper and detent elements respectively fixed upon and carried by said plates, one of said locking elements being carried by and between said pin carrying members, and means carried upon said seat for releasing said detent from said keeper for adjustment of said seat to a new position.

8. A seat supporting structure according to claim 6, in which said bearing faces and said pins slidable therealong provide for fore-and-aft adjustment of said seat, and means for locking said seat in adjusted position comprising keeper and detent elements respectively fixed upon and carried by said plates, one of said locking elements being carried by and between said pin carrying members, means carried upon said seat for releasing said detent from said keeper for adjustment of said seat to a new position, and a rack-ment and-gear means cooperative between the plates for actuation to effect a fore-and-aft adjustment of the seat when the locking means is released.

JOHN P. DE ROSE.

REFERENCES CITED

The following references are of record in the file of this patent:

UNITED STATES PATENTS

| Number | Name | Date |
| --- | --- | --- |
| 1,957,785 | Knapp | May 8, 1934 |
| 2,204,894 | Johnson | June 18, 1940 |
| 2,179,129 | McGregor | Nov. 7, 1939 |
| 2,132,009 | Ball | Oct. 4, 1938 |
| 2,298,351 | DeRose | Oct. 13, 1942 |
| 2,272,980 | McLellan et al. | Feb. 10, 1942 |